United States Patent
Gosling (10) Patent No.: US 12,434,267 B2
(45) Date of Patent: Oct. 7, 2025

(54) WARP RESISTANT PANELS

(71) Applicant: DIRTT ENVIRONMENTAL SOLUTIONS LTD., Calgary (CA)

(72) Inventor: Geoff W. Gosling, Calgary (CA)

(73) Assignee: DIRTT ENVIRONMENTAL SOLUTIONS LTD. (CA)

( * ) Notice: Subject to any disclaimer, the term of this patent is extended or adjusted under 35 U.S.C. 154(b) by 511 days.

(21) Appl. No.: 17/606,666

(22) PCT Filed: Jul. 28, 2020

(86) PCT No.: PCT/US2020/043850
§ 371 (c)(1),
(2) Date: Oct. 26, 2021

(87) PCT Pub. No.: WO2021/021793
PCT Pub. Date: Feb. 4, 2021

(65) Prior Publication Data
US 2022/0205238 A1 Jun. 30, 2022

Related U.S. Application Data (60) Provisional application No. 62/880,373, filed on Jul. 30, 2019.

(51) Int. Cl.
*B05D 7/06* (2006.01)
*B05D 7/08* (2006.01)
(Continued)

(52) U.S. Cl.
CPC ............ *B05D 7/06* (2013.01); *B05D 7/08* (2013.01); *B27N 7/00* (2013.01); *B27N 7/005* (2013.01);
(Continued)

(58) Field of Classification Search
None
See application file for complete search history.

(56) References Cited

U.S. PATENT DOCUMENTS 3,300,924 A * 1/1967 Ashby ................ E04F 21/185
52/489.1
3,998,018 A * 12/1976 Hodges ................ E04B 2/789
52/363
(Continued)

FOREIGN PATENT DOCUMENTS

BE 1001018 A6 * 6/1989 ............ B27N 7/005
CA 2516083 A1 * 2/2006 ........... E04B 2/7424
(Continued)

OTHER PUBLICATIONS

Machine Translation of CN-201972359-U, Apr. 2011 (Year: 2011).*
(Continued)

*Primary Examiner* — Jeffrey A Vonch
(74) *Attorney, Agent, or Firm* — Workman Nydegger (57) ABSTRACT

A composite wood prefabricated wall panel configured for reduced moisture absorption includes a composite wood panel body, one or more connection components, and a priming layer. The composite wood panel body includes a front face, a rear face, and at least one edge. The one or more connection components are affixed to the rear face or the at least one edge, and the one or more connection components are configured to secure the composite wood prefabricated wall panel to one or more structural members of a prefabricated wall system. The priming layer is disposed over one or more surfaces of the composite wood panel body.

18 Claims, 7 Drawing Sheets

(51) Int. Cl.

| | |
|---|---|
| *B27N 7/00* | (2006.01) |
| *B32B 21/02* | (2006.01) |
| *B32B 21/04* | (2006.01) |
| *B32B 21/08* | (2006.01) |
| *B32B 21/12* | (2006.01) |
| *B32B 37/00* | (2006.01) |
| *E04B 1/66* | (2006.01) |
| *E04B 2/00* | (2006.01) |
| *E04B 2/72* | (2006.01) |
| *E04B 2/74* | (2006.01) |
| *E04B 2/90* | (2006.01) |
| *E04C 2/16* | (2006.01) |
| *E04C 2/38* | (2006.01) |
| *E04C 2/52* | (2006.01) |
| *E04F 13/08* | (2006.01) |
| *B32B 21/14* | (2006.01) |
| *B44C 1/10* | (2006.01) |
| *B44C 5/04* | (2006.01) |

(52) U.S. Cl.
CPC ............. *B32B 21/02* (2013.01); *B32B 21/04* (2013.01); *B32B 21/08* (2013.01); *B32B 21/12* (2013.01); *B32B 37/0038* (2013.01); *E04B 1/665* (2013.01); *E04B 2/72* (2013.01); *E04B 2/7407* (2013.01); *E04B 2/7448* (2013.01); *E04C 2/16* (2013.01); *E04C 2/38* (2013.01); *E04C 2/46* (2013.01); *E04C 2/528* (2013.01); *B32B 21/042* (2013.01); *B32B 21/14* (2013.01); *B32B 2255/08* (2013.01); *B32B 2255/24* (2013.01); *B32B 2262/067* (2013.01); *B32B 2307/7265* (2013.01); *B32B 2307/73* (2013.01); *B32B 2307/734* (2013.01); *B32B 2479/00* (2013.01); *B32B 2607/00* (2013.01); *B32B 2607/02* (2013.01); *B44C 1/10* (2013.01); *B44C 5/043* (2013.01); *B44C 5/0461* (2013.01); *E04B 2002/7462* (2013.01); *E04B 2/90* (2013.01); *E04B 2103/04* (2013.01); *E04F 13/0841* (2013.01); *E04F 13/0842* (2013.01); *E04F 13/0851* (2013.01); *Y10S 428/9133* (2013.01); *Y10T 428/24008* (2015.01)

(56) References Cited

U.S. PATENT DOCUMENTS

| | | | | |
|---|---|---|---|---|
| 5,932,350 A * | 8/1999 | Lauer | ........................ | B05D 7/06 |
| | | | | 428/411.1 |
| 5,974,753 A * | 11/1999 | Hsu | ..................... | E04F 13/0862 |
| | | | | 52/287.1 |
| 6,548,109 B1 * | 4/2003 | Hagquist | ................... | B27K 3/15 |
| | | | | 427/393 |
| 10,697,183 B1 * | 6/2020 | Ferguson | ............ | E04B 1/34321 |
| 2002/0112443 A1 * | 8/2002 | Shipman | ............... | E04B 2/7424 |
| | | | | 52/745.13 |
| 2003/0148135 A1 * | 8/2003 | Ellstrom | ................. | B32B 21/14 |
| | | | | 428/689 |
| 2004/0060253 A1 * | 4/2004 | Elsing | ................. | E04F 13/0835 |
| | | | | 52/384 |
| 2006/0010820 A1 * | 1/2006 | Schwitte | ............. | E04F 13/0846 |
| | | | | 52/592.1 |
| 2006/0053738 A1 * | 3/2006 | Jaffee | ...................... | B32B 21/10 |
| | | | | 52/741.3 |
| 2008/0041003 A1 * | 2/2008 | Nowak | ..................... | B27N 7/00 |
| | | | | 52/847 |
| 2012/0027957 A1 * | 2/2012 | Braun | ................... | B44C 5/0476 |
| | | | | 427/595 |
| 2012/0151872 A1 * | 6/2012 | Pauley | ....................... | E04B 1/10 |
| | | | | 52/745.09 |
| 2017/0009450 A1 * | 1/2017 | Gosling | ................. | E04B 2/7424 |

FOREIGN PATENT DOCUMENTS

| | | | | |
|---|---|---|---|---|
| CH | 616617 A5 * | 4/1980 | ............. | C08G 12/32 |
| CH | 692844 A5 * | 11/2002 | ............. | B27N 7/005 |
| CN | 1640555 A * | 7/2005 | | |
| CN | 1836862 A * | 9/2006 | | |
| CN | 101549520 A * | 10/2009 | | |
| CN | 201972359 U * | 9/2011 | | |
| CN | 106381978 A * | 2/2017 | .......... | E04F 13/0835 |
| CN | 106457602 A * | 2/2017 | ............... | B27N 3/08 |
| CN | 206926332 U * | 1/2018 | | |
| DE | 19615879 A1 * | 10/1996 | ............... | B27N 7/00 |
| DE | 69727079 T2 * | 11/2004 | ............... | C08L 97/02 |
| DE | 202016103049 U1 * | 8/2016 | .......... | E04F 13/0894 |
| EA | 014859 B1 * | 2/2011 | ............... | B05D 3/06 |
| EP | 0009053 A1 * | 4/1980 | ............... | E04C 2/246 |
| EP | 0171235 A2 * | 2/1986 | .......... | C09D 151/003 |
| EP | 0324038 A1 * | 7/1989 | ............... | B44C 1/24 |
| EP | 0418595 A2 * | 3/1991 | .......... | E04B 2/7409 |
| EP | 1134093 A2 * | 9/2001 | .......... | B29C 43/003 |
| EP | 1749587 A1 * | 2/2007 | ............. | B27N 7/005 |
| EP | 1454763 B1 * | 8/2009 | ............... | E04F 15/02 |
| EP | 3450517 A1 * | 3/2019 | | |
| GB | 2447896 | 10/2008 | | |
| JP | 10237257 A * | 9/1998 | | |
| JP | 2005324186 A * | 11/2005 | | |
| JP | 2006348498 A * | 12/2006 | | |
| KR | 20090128080 A * | 12/2009 | ............... | C08L 1/02 |
| KR | 2016/0002437 | 1/2016 | | |
| KR | 20170070242 A * | 6/2017 | ............. | B32B 37/10 |
| NO | 139057 B * | 9/1978 | ............... | E04B 2/78 |
| PT | 725765 E * | 8/2000 | ............... | C04B 28/32 |
| RU | 106859 U1 * | 7/2011 | | |
| WO | WO-9621070 A1 * | 7/1996 | .......... | E04B 2/7433 |
| WO | WO-0071620 A1 * | 11/2000 | ............... | C08L 97/02 |
| WO | WO-03045646 A1 * | 6/2003 | ............. | B27N 1/006 |
| WO | WO-2005072957 A1 * | 8/2005 | ............... | E04F 13/08 |
| WO | WO-2007033988 A1 * | 3/2007 | .......... | B27K 5/0085 |
| WO | 2015/000793 | 1/2015 | | |
| WO | WO-2015126762 A1 * | 8/2015 | .......... | E04B 2/7425 |
| WO | WO-2017017139 A1 * | 2/2017 | ............... | E04B 1/74 |

OTHER PUBLICATIONS

Shepard, Avoid MDF Fuzzies and Extra Sanding, Jan. 2019, <https://www.thesprucecrafts.com/avoid-extra-sanding-prime-mdf-2365111> (Year: 2019).*

Ananda, Paint Primer 101: Latex vs Shellac vs Oil Based, Aug. 2019, <https://www.apieceofrainbow.com/choose-paint-primer-latex-shellac-oil/> (Year: 2019).*

Toid, How to seal and Paint MDF for the Perfect Finish, Mar. 2018, <https://www.youtube.com/watch?v=pzfwlApzy70> (Year: 2018).*

Darlington, How to prime MDF, Oct. 2019, <https://www.youtube.com/watch?v=Lyq0hFWnAz8> (Year: 2019).*

Resene, Primers, Sealers and Undercoats, Feb. 2009 (Year: 2009).*

Machine Translation of CN-106381978-A, Feb. 2017 (Year: 2017).*

International Preliminary Report on Patentability received for PCT Patent Application No. PCT/US2020/043850, mailed on Feb. 10, 2022, 10 pages.

International Search Report and Written Opinion for PCT/US2020/043850 mailed Oct. 8, 2020.

* cited by examiner

WARP RESISTANT PANELS

CROSS-REFERENCE TO RELATED APPLICATIONS

The present application is a US 371 Nationalization of International Application No. PCT/US2020/043850, filed Jul. 28, 2020, which claims the benefit of and priority to U.S. Application No. 62/880,373, filed Jul. 30, 2019. The entire content of each of the aforementioned patent applications is incorporated herein by reference.

BACKGROUND

Office space can be relatively expensive, not only due to the basic costs of the location and size of the office space, but also due to any construction needed to configure the office space in a particular way. Furthermore, as an organization's needs change, it is often necessary to have a convenient and efficient means to reconfigure the existing office space rather than having to move to a new office space. For example, interior office space is sometimes partitioned into smaller areas, such as conference rooms, offices, cubicles, and the like. Furthermore, other interior spaces (e.g., residential spaces) can be divided into partitions for various purposes.

Interior spaces can be divided utilizing prefabricated wall systems (e.g., modular wall systems) that include one or more prefabricated wall modules. Prefabricated wall modules may include one or more prefabricated wall panels. The prefabricated wall modules can be arranged/secured adjacent to one another to form interior partitions, such as office cubicles, rooms, etc. Many organizations address their configuration and reconfiguration issues by dividing large, open office spaces into individual work areas using prefabricated wall systems.

However, in some instances, prefabricated wall modules and/or panels can be expensive, heavy, difficult to manufacture, and/or aesthetically displeasing. For example, restrictive regulatory requirements and/or industry standards related to conventional prefabricated wall and/or panel materials can impose difficulties in achieving design goals of cost, weight, manufacturability, durability, and/or aesthetics.

Accordingly, there are a number of difficulties associated with prefabricated wall modules and/or prefabricated wall panels that can be addressed.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Implementations of the present disclosure extend to systems, apparatuses, components, and methods for forming, assembling, and/or installing components for a prefabricated wall system. More specifically, the present disclosure relates to composite wood prefabricated wall panels, prefabricated wall systems, and methods for forming composite wood prefabricated wall panels that provide for reduced moisture absorption.

The embodiments disclosed and claimed herein can provide prefabricated wall panels and/or prefabricated wall systems in an advantageous manner. For instance, at least some implementations of the present disclosure may enable users to continue to utilize medium density fiberboard (MDF) panels for prefabricated wall panels/systems by providing cost-effective techniques for reducing the moisture absorption properties of the MDF panels without altering the MDF manufacturing process and/or the composition of the composite wood material itself.

For example, a composite wood prefabricated wall panel configured for reduced moisture absorption can comprise a composite wood panel body, one or more connection components, and a priming layer. The composite wood panel body can comprise a front face, a rear face, and at least one edge. The one or more connection components may be affixed to the rear face or the at least one edge, and the one or more connection components may be configured to secure the composite wood prefabricated wall panel to one or more structural members of a prefabricated wall system. Furthermore, the priming layer may be disposed over one or more surfaces of the composite wood panel body.

In another example, a prefabricated wall system configured for reduced moisture absorption can comprise a plurality of composite wood prefabricated wall panels and a frame module. The plurality of composite wood prefabricated wall panels can include at least a first composite wood prefabricated wall panel and a second composite wood prefabricated wall panel. The first composite wood prefabricated wall panel can comprise a first front face, a first rear face, and a first priming layer disposed over at least the first front face and the first rear face. The second composite wood prefabricated wall panel can comprise a second front face, a second rear face, and a second priming layer disposed over at least the second front face and the second rear face.

The frame module can comprise at least a vertical structural member and a horizontal structural member. The first composite wood prefabricated wall panel and the second composite wood prefabricated wall panel may be selectively securable to the frame module. When the first composite wood prefabricated wall panel and the second composite wood prefabricated wall panel are secured to the frame module, the first rear face and the second rear face may be oriented toward one another.

In yet another example, a method for forming a composite wood prefabricated wall panel with reduced moisture absorption properties can comprise obtaining a composite wood panel body, where the composite wood panel body includes a front face, a rear face, and at least one edge. The method can also include disposing a priming layer over the front face and the rear face of the composite wood panel body. Furthermore, the method can also include affixing one or more connection components to the rear face over the priming layer.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Implementations of the present disclosure extend to systems, apparatuses, components, and methods for forming, assembling, and/or installing components for a prefabricated wall system. More specifically, the present disclosure relates to composite wood prefabricated wall panels, prefabricated wall systems, and methods for forming composite wood prefabricated wall panels that provide for reduced moisture absorption.

The embodiments disclosed and claimed herein can provide prefabricated wall panels and/or prefabricated wall systems in an advantageous manner MDF is a dense but workable composite wood construction material. MDF is typically constructed of a mixture of wood fiber, urea-formaldehyde resin glue, water, and paraffin wax. MDF is relatively inexpensive, may receive a variety of aesthetic finishes, and may provide sufficient durability for use in prefabricated and/or modular wall systems (e.g., even where reconfiguration of wall panels is expected). Accordingly, many builders, manufacturers, and/or designers (e.g., "users") desire to use MDF as a material for forming prefabricated wall panels for use in prefabricated wall systems.

However, regulatory requirements have emerged in at least some localities constrain the amount/ratio of formaldehyde-based substances permitted for use in construction materials such as MDF. Unfortunately, a reduction in formaldehyde content in MDF panels is known to increase the moisture absorption properties of the MDF panels, which may cause the prefabricated wall panels to warp (e.g., even after installation into a prefabricated wall system).

Accordingly, in many instances, whereas MDF panels with historically conventional amounts/ratios of formaldehyde content may avoid warping issues caused by moisture absorption, MDF panels with amounts/ratios of formaldehyde content that conform to new regulatory requirements may experience increased warping issues caused by moisture absorption. Warping of MDF panels used in prefabricated wall panels of a prefabricated wall systems may undermine the aesthetics and/or structural soundness of the prefabricated wall system.

Despite such regulatory requirements, at least some implementations of the present disclosure may enable users to continue to utilize MDF panels for prefabricated wall panels/systems (in accordance with applicable regulatory regulations regarding formaldehyde content) by providing cost-effective techniques for reducing the moisture absorption properties of the MDF panels without altering the MDF manufacturing process and/or the composition of the composite wood material itself.

For example, at least some implementations of the present disclosure include a priming layer disposed over multiple faces of a composite wood prefabricated wall panel. At least some implementations of the present disclosure include a priming layer disposed over at least some faces of the composite wood prefabricated wall panel that omit an aesthetic layer and/or are substantially occluded from view when installed in a prefabricated wall system. In contrast, routine, conventional, and/or well-understood techniques utilize a priming layer as a preparatory layer that is disposed on viewing/viewable surfaces before painting or disposing an aesthetic layer thereon.

The priming layer may reduce the moisture absorption properties of the composite wood prefabricated wall panel without significant alterations to the composite wood manufacturing process and/or the composition of the composite wood prefabricated wall panel itself. Such a result may be realized even in MDF panels that comply with regulatory requirements that constrain formaldehyde content.

Figure 1:
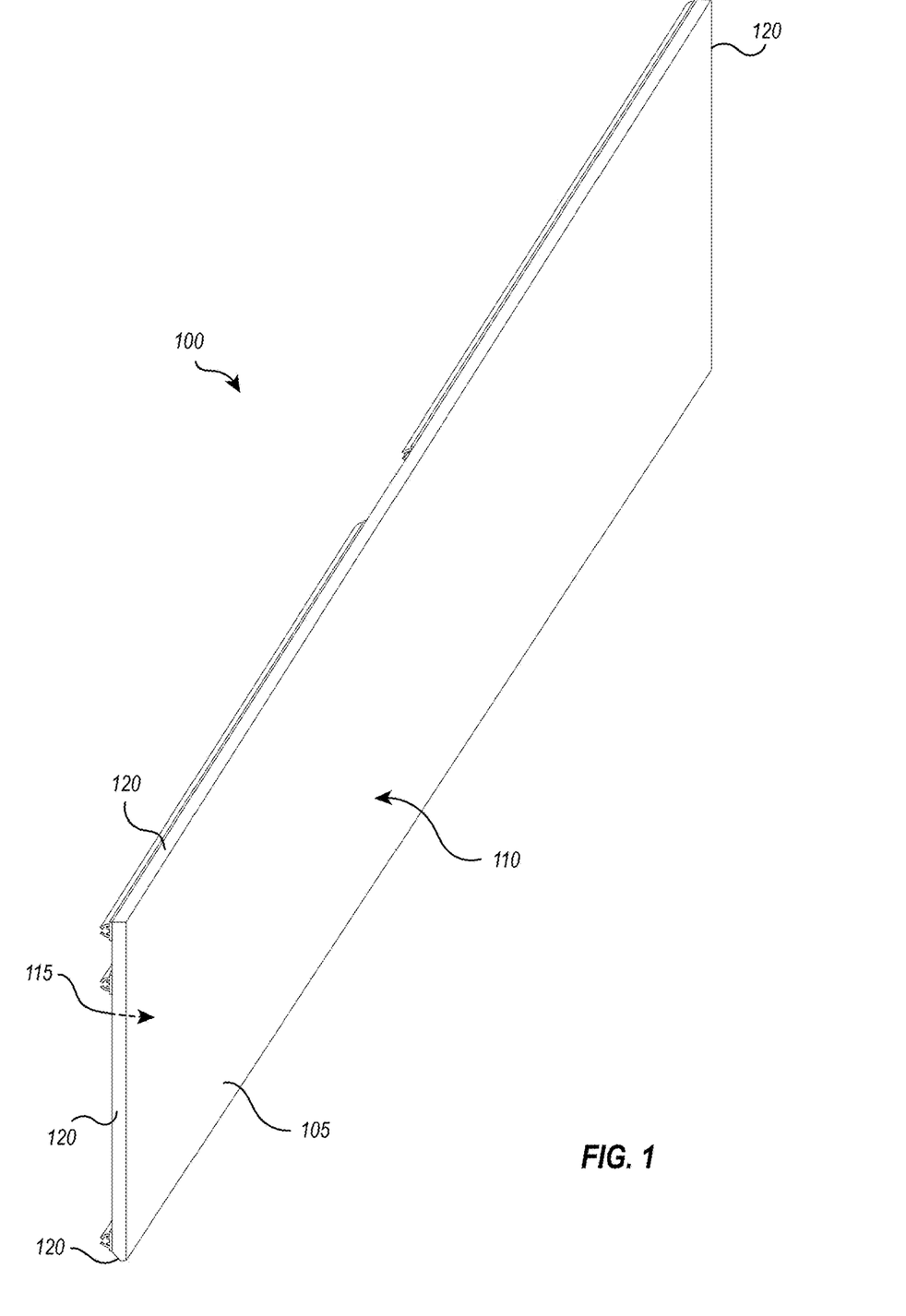
FIG. 1 illustrates a perspective view of a prefabricated wall panel, in accordance with implementations of the present disclosure.

FIG. 1 illustrates a perspective view of a prefabricated wall panel 100 configured for reduced moisture absorption, according to implementations of the present disclosure. In some instances, as indicated above, the prefabricated wall panel 100 has a composite wood panel body 105 that comprises a composite wood material, such as MDF. The composite wood panel body 105 may comprise a front face 110, a rear face 115, and a plurality of edges 120.

Although the present disclosure focuses, in some respects, on prefabricated wall panels 100 composed of MDF, those skilled in the art will appreciate, in view of the present disclosure, that other composite wood materials are within the scope of this disclosure.

Figure 2:
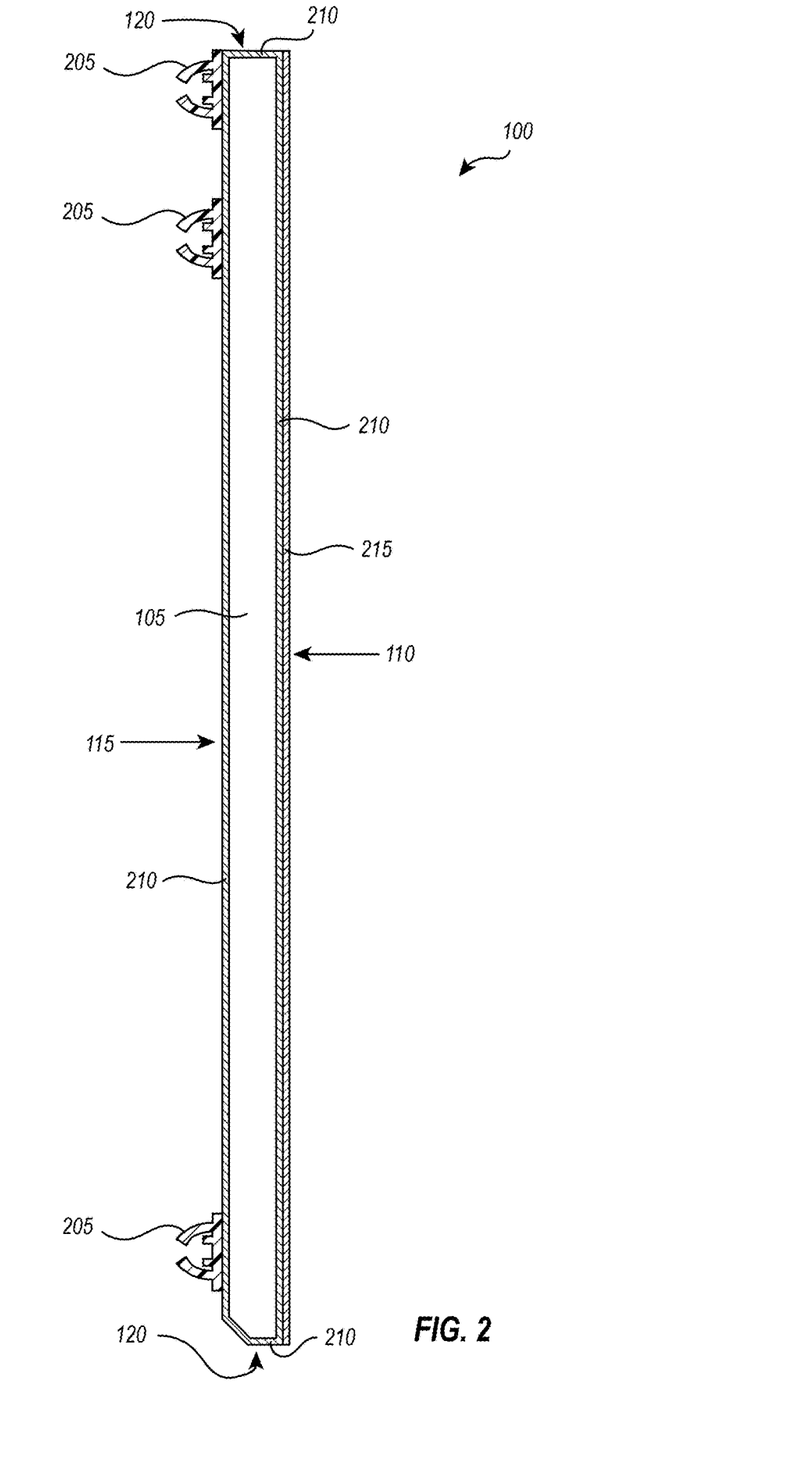
FIG. 2 illustrates an end cross-sectional view of a prefabricated wall panel, in accordance with implementations of the present disclosure.

FIG. 2 illustrates an end view of the prefabricated wall panel 100. FIG. 2 shows that the prefabricated wall panel 100 may include one or more connection components 205 affixed to the rear face 115 (or another portion, such as along an edge 120) of the composite wood panel body 105 of the prefabricated wall panel 100. The connection components 205 may be configured to secure the prefabricated wall panel 100 to one or more structural members of a prefabricated wall system (e.g., horizontal structural members 310 of prefabricated wall system 300, see FIG. 3).

Figure 2A:
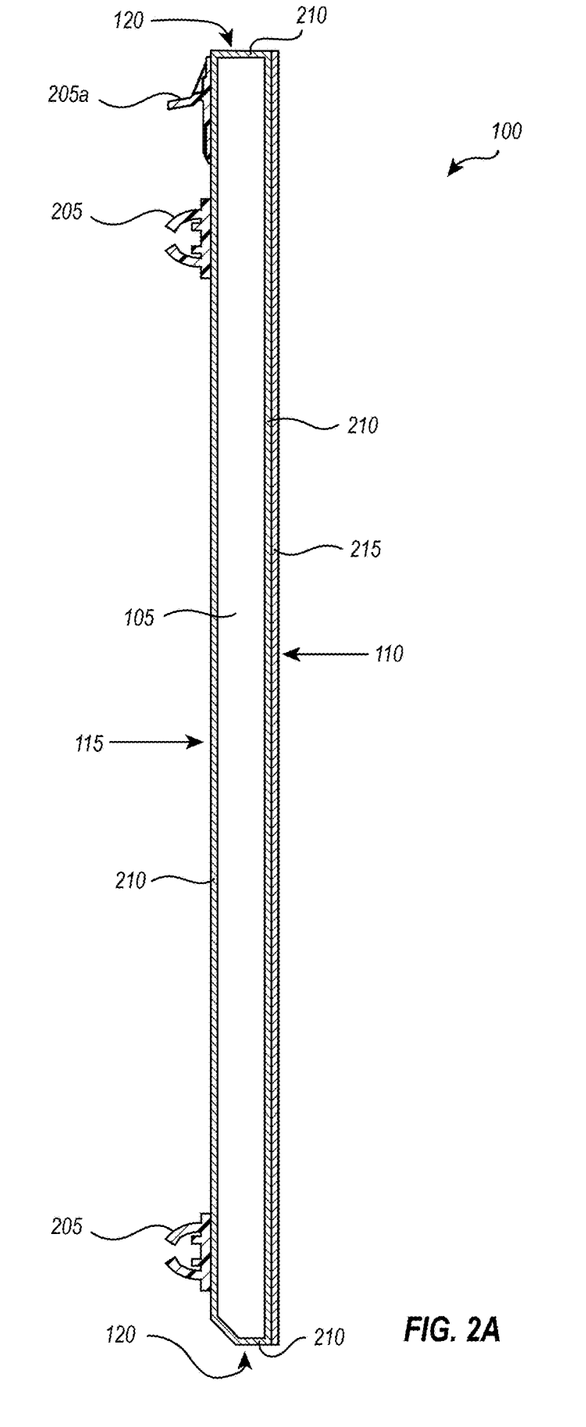
FIG. 2A illustrates another end cross-sectional view of a prefabricated wall panel, in accordance with implementations of the present disclosure.

FIG. 2 illustrates an implementation in which the connection components 205 comprise opposing arms that form an engagement channel shaped to receive a corresponding engagement protrusion associated with a structural member of a prefabricated wall system. Other configurations and/or combinations of configurations for connection components 205 of a prefabricated wall panel 100 are within the scope of this disclosure. For example, a connection component 205 may comprise an engagement protrusion configured to engage with an engagement channel associated with a structural member of a prefabricated wall system. A connection component 205 may comprise any type of hanging element(s) and/or interlocking/inter-fitting element(s), without limitation. FIG. 2A illustrates an implementation wherein prefabricated wall panel 100 comprises a connection component 205 that comprises opposing arms that form an engagement channel shaped to receive a corresponding engagement protrusion associated with a structural member and a connection component 205a that comprises a hanging element.

FIG. 2 also illustrates that the composite wood panel body 105 may comprise a priming layer 210 disposed over various surfaces of the composite wood panel body 105. In some instances, the priming layer 210 may comprise a priming agent that is ordinarily utilized as an intermediate layer, undercoat, and/or preparatory layer for receiving a layer of paint (or another aesthetic layer) over the priming layer 210. By way of non-limiting example, the priming layer 210 may comprise an oil-based priming agent, a latex-based priming agent, and/or a shellac-based priming agent. In some instances, the priming layer 210 reduces the moisture absorption properties of the composite wood panel body 105 of the prefabricated wall panel 100.

A user may dispose the priming layer 210 over the composite wood panel body 105 of the prefabricated wall panel 100 in various ways in different implementations. For example, FIG. 2 illustrates an implementation in which the composite wood panel body 105 comprises the priming layer 210 disposed over the front face 110, the rear face 115, and all edges 120 of the composite wood panel body 105. In some instances, disposing the priming layer 210 over all faces and edges of the composite wood panel body 105 may significantly reduce the moisture absorption of the prefabricated wall panel 100 (and therefore reduce warping brought about by moisture absorption).

In other implementations, the composite wood panel body 105 comprises the priming layer 210 omitted from one or more edges 120 and disposed over at least a portion of the front face 110 and the rear face 115 (e.g., with the connection component(s) 205 affixed to the composite wood panel body 105 over the priming layer 210). In yet other implementations, the composite wood panel body 105 comprises the priming layer 210 omitted from the front face 110 and disposed over at least a portion of the rear face 115 and one or more edges 120. Accordingly, various configurations for disposing the priming layer 210 over the surfaces of the composite wood panel body 105 are within the scope of this disclosure.

FIG. 2 also illustrates that the prefabricated wall panel 100 may include, in some instances, an aesthetic layer 215 disposed over at least a portion of the priming layer 210. For example, FIG. 2 shows an aesthetic layer 215 disposed over the priming layer 210 that is disposed on the front face 110 of the composite wood panel body 105 of the prefabricated wall panel 100. In other instances, the aesthetic layer is at least partially disposed over one or more edges 120 of the composite wood panel body 105 (e.g., disposed over the priming layer 210 that is disposed over one or more edges 120) and/or at least partially over the rear face 115 (e.g., disposed over the priming layer 210 that is disposed over the rear face 115).

Figure 3:
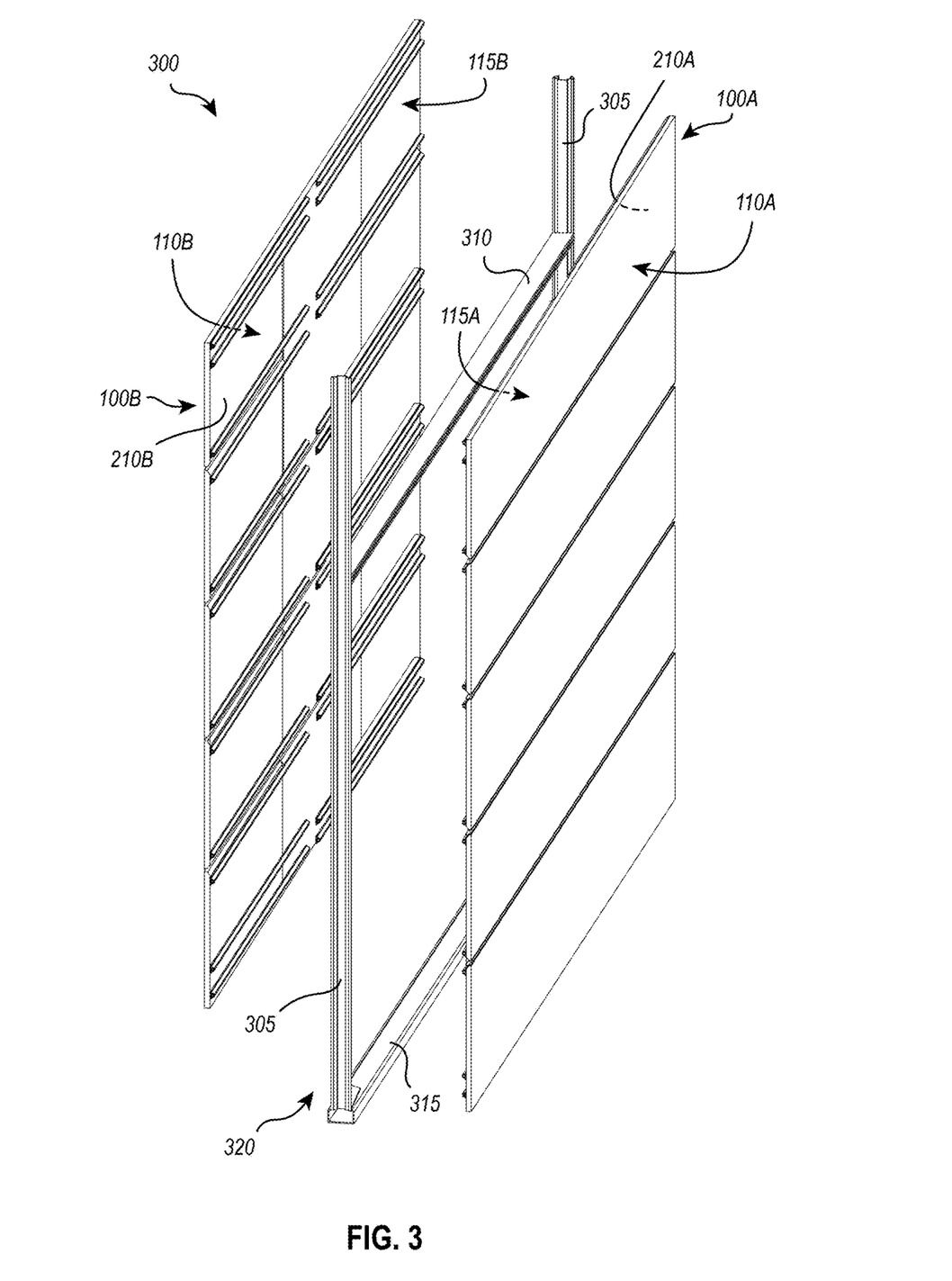
FIG. 3 illustrates a perspective exploded view of a prefabricated wall system, in accordance with implementations of the present disclosure.

In some instances, the aesthetic layer enables the prefabricated wall panel 100 to be adapted to various design schemes for interior spaces at least partially formed by the prefabricated wall panel 100 (e.g., spaces partitioned by a prefabricated wall system 300 in which the prefabricated wall panel 100 forms at least a portion of a wall thereof). In this regard, an aesthetic layer 215 may comprise various materials, such as, by way of non-limiting example, paint, veneer, thermofoil, fabric, and/or others.

In addition, FIG. 2 illustrates that certain surfaces/portions of the prefabricated wall panel 100 may omit the aesthetic layer 215 (e.g., surfaces/portions where the aesthetic layer 215 does not extend). For example, FIG. 2 illustrates that the rear face 115 (whereon the connection component(s) 205 are secured) and/or one or more edges 120 of the composite wood panel body 105 omit the aesthetic layer 215 such that the aesthetic layer does not extend over the rear face 115 and/or the one or more edges 120.

In some instances, because the rear face 115 and/or the edges 120 are substantially occluded from view when the prefabricated wall panel 100 is installed on a prefabricated wall system, omitting the aesthetic layer 215 from such surfaces may reduce material costs associated with forming a prefabricated wall panel 100 without affecting the aesthetic qualities of the prefabricated wall panel 100 (when installed in a prefabricated wall system 300).

Although FIG. 2 illustrates an implementation in which no portion of the aesthetic layer 215 extends over the rear face 115 of the composite wood panel body 105 of the prefabricated wall panel 100, at least some implementations of the present disclosure include the aesthetic layer 215 disposed over only a portion of the rear face 115 (e.g., disposed over only a portion of the priming layer 210 that is disposed over the rear face 115).

For example, in some implementations, the aesthetic layer 215 comprises fabric, thermofoil, and/or another wrap-able material that wraps around the front face 110, the edges 120, and extends partially onto the rear face 115. In other examples, the aesthetic layer 215 comprises paint (or a similar composition), and at least some paint may become disposed (e.g., intentionally or accidentally) over one or more edges 120 and/or the rear face 115 while applying the paint to the composite wood panel body 105. In such and other similar implementations, the aesthetic layer 215 may be regarded as being substantially omitted from the rear face 115 and/or the edges 120 (e.g., where the aesthetic layer 215 does not extend over 50%, 60%, 70%, 80%, 90%, or more of the rear face 115 and/or the edges 120).

FIG. 3 illustrates a perspective exploded view of a prefabricated wall system 300. The prefabricated wall system 300 includes a frame module 320 comprising one or more vertical structural members 305 and one or more horizontal structural members 310 (FIG. 3 illustrates only a single horizontal structural member 310 for clarity). The vertical structural members 305 may attach to a floor track 315 and/or a ceiling track (not shown) and may thereby become secured to permanent portions of an installation space.

Figure 3A:
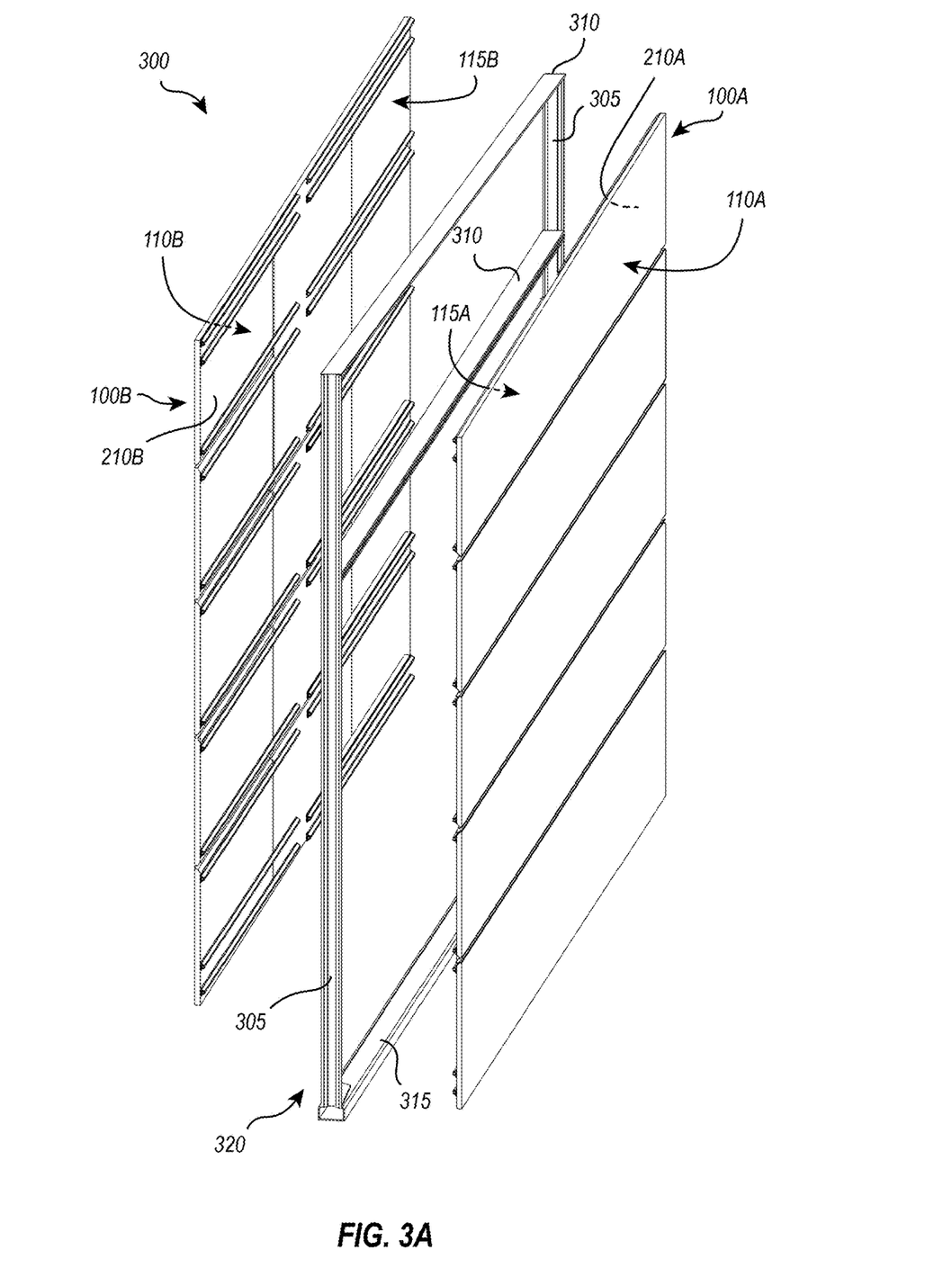
FIG. 3A illustrates a perspective exploded view of a prefabricated wall system, in accordance with implementations of the present disclosure.

The prefabricated wall system 300 also includes a plurality of prefabricated wall panels 100, including prefabricated wall panel 100A and prefabricated wall panel 100B. As indicated above, the prefabricated wall panels 100A and 100B may secure to one or more horizontal structural members 310 of the prefabricated wall system 300. FIG. 3A shows that one or more horizontal structural member 310 can be configured to include a protrusion that interfaces with the connection component of a prefabricated wall panel (such as connection component 205) or to include a receiving portion wherein a prefabricated wall panel can be hung by way of a connection component 205a. Accordingly, the prefabricated wall system 300 (and particularly the prefabricated wall panels 100 of the prefabricated wall system 300) may be configured for reduced moisture absorption, according to the present disclosure.

Prefabricated wall panel 100A and prefabricated wall panel 100B correspond, in at least some respects, to the prefabricated wall panel 100 described hereinabove with reference to FIGS. 1 and 2. For example, prefabricated wall panels 100A and 100B may each include a front face (110A and 110B, respectively), a rear face (115A and 115B, respectively), and a priming layer (210A and 210B, respectively). Similar to the implementations described above, rear face 115A of prefabricated wall panel 100A may include priming layer 210A disposed thereon, and rear face 115B of prefabricated wall panel 100B may include priming layer 210B disposed thereon.

Figure 4:
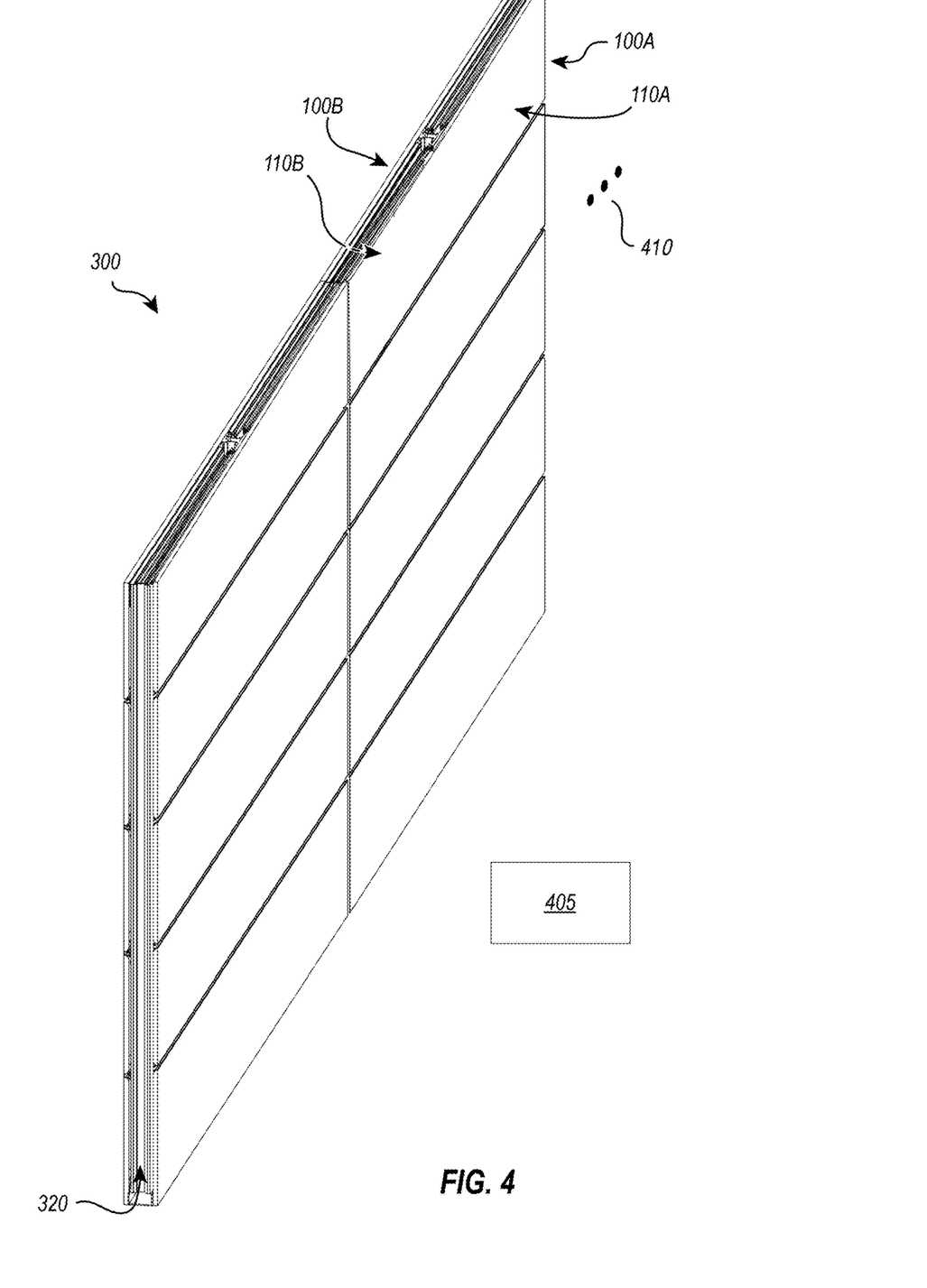
FIG. 4 illustrates a perspective assembled view of a prefabricated wall system, in accordance with implementations of the present disclosure.

FIG. 4 illustrates a perspective assembled view of the prefabricated wall system 300 with additional prefabricated wall panels 100 added thereto and installed thereon (the ellipsis 410 indicates that a prefabricated wall system 300 may include any number of additional prefabricated wall panels 100 and/or other components installed thereon). FIGS. 3 and 4 illustrate that prefabricated wall panels 100A and 100B are selectively securable to the frame module 320 of the prefabricated wall system 300 (e.g., each of prefabricated wall panel 100A and 100B may include connection components to secure to the horizontal structural member 310 of the frame module 320). For example, prefabricated wall panels 100A and 100B may form opposing sides of a wall of the prefabricated wall system 300 for subdividing an installation space (e.g., to at least partially form a room 405, illustrated in FIG. 4).

Furthermore, FIGS. 3 and 4 illustrate that when the prefabricated wall panels 100A and 100B are secured to the frame module 320, the rear faces 115A and 115B of the prefabricated wall panels 100A and 100B with the priming layers 210A and 210B disposed thereon may become oriented toward one another.

Under such a configuration (with both prefabricated wall panels 100A and 100B secured to the frame module 320, as illustrated in FIG. 4), the rear faces 115A and 115B of the prefabricated wall panels 100A and 100B are substantially concealed from view (e.g., when viewed from an interior of the room 405 that is at least partially formed by the prefabricated wall system 300). For example, the prefabricated wall panels 100A and 100B may omit hinges and/or other pivoting mechanisms such that the prefabricated wall panels 100A and 100B are not selectively openable/rotatable to expose the rear faces 115A and 115B thereof.

Stated differently, when both prefabricated wall panels 100A and 100B secured to the frame module 320, as illustrated in FIG. 4, the rear faces 115A and 115B may remain concealed from view when the prefabricated wall panels 100A and 100B are installed within the prefabricated wall system 300. For example, the prefabricated wall panels 100A and 100B may form an interior space within a wall of the prefabricated wall system 300 that remains concealed while the prefabricated wall system is intact.

Furthermore, when both prefabricated wall panels 100A and 100B are secured to the frame module 320, as illustrated in FIG. 4, the front faces 110A and 110B of the prefabricated wall panels 100A and 100B may become directed away from the horizontal structural member(s) 310 of the prefabricated wall system 300 (e.g., front face 110A may become directed toward the interior of the room 405 at least partially formed by the prefabricated wall system 300). In addition, the rear faces 115A and 115B of the prefabricated wall panels 100A and 100B may become directed toward the horizontal structural member(s) 310 of the prefabricated wall system 300 (e.g., rear face 115B may become directed away from the interior of the room 405 at least partially formed by the prefabricated wall system 300).

Figure 5:
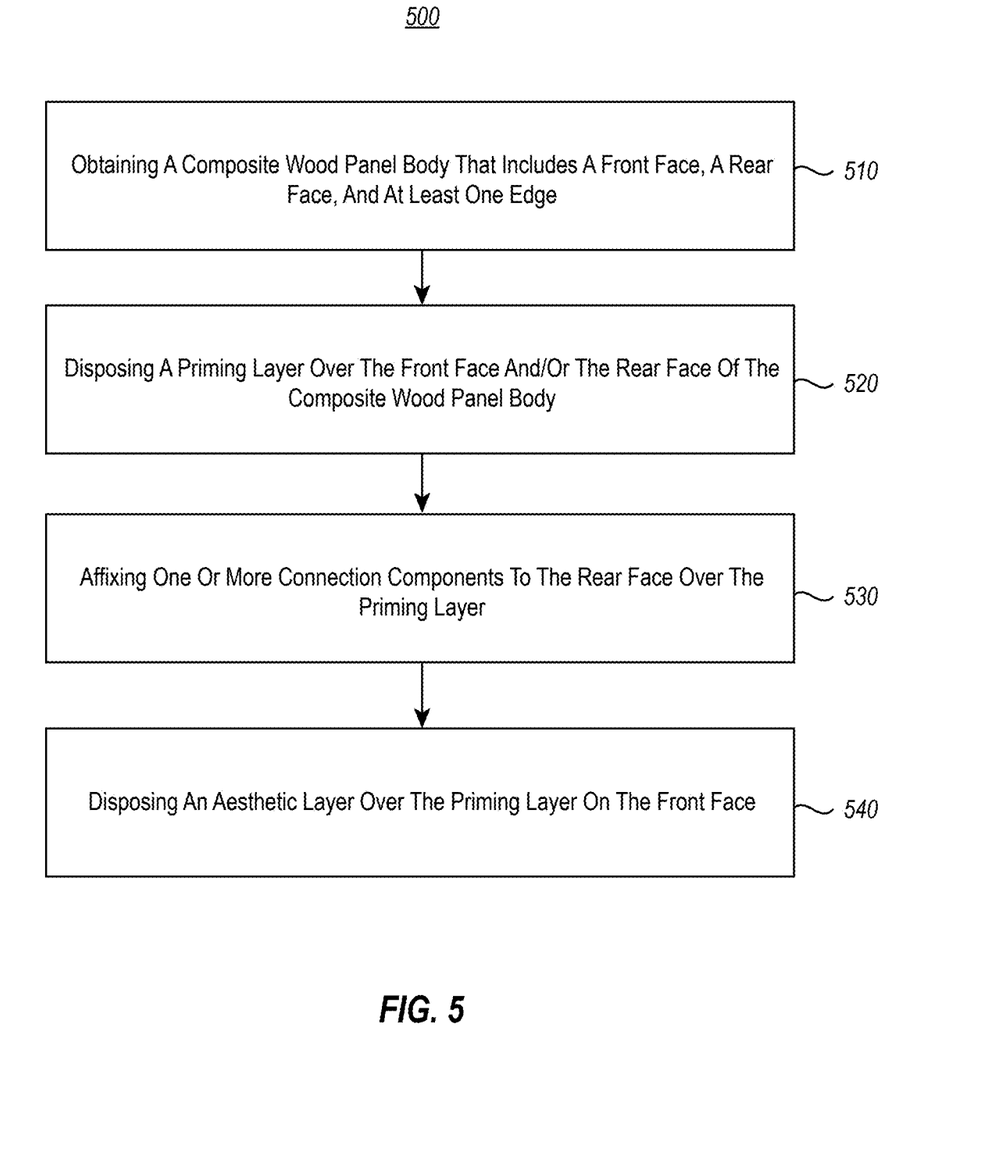
FIG. 5 illustrates an example flow diagram depicting acts associated with forming a composite wood prefabricated wall panel with reduced moisture absorption properties, in accordance with implementations of the present disclosure.

At least some implementations of the present disclosure can be described in terms of acts (e.g., acts associated with a method) for accomplishing a particular result. Along these lines, FIG. 5 illustrates an example flow diagram 500 depicting acts associated with forming a composite wood prefabricated wall panel with reduced moisture absorption properties. Although the steps shown in flow diagram 500 may be illustrated or discussed in a certain order, no particular ordering is required unless specifically stated or required because an act is dependent on another act being completed prior to the act being performed.

Furthermore, it should be noted that not all steps represented in flow diagram 500 are essential for forming a composite wood prefabricated wall panel with reduced moisture absorption properties as presently disclosed. The steps and/or acts of FIG. 5 are described below with reference to the systems, components, and structures of FIGS. 1-4. For instance, reference numerals included parenthetically hereinbelow refer, by way of illustrative example, to systems, components, structures, and/or elements described hereinabove with reference to FIGS. 1-4.

Flow diagram 500 depicts acts of obtaining a composite wood panel body that includes a front face, a rear face, and at least one edge (act 510), disposing a priming layer over the front face and/or the rear face of the composite wood panel body (act 520), affixing one or more connection components to the rear face or one or more edges over the priming layer (act 530), and disposing an aesthetic layer over the priming layer on the front face (act 540).

As indicated above, act 510 includes obtaining a composite wood panel body (105) that includes a front face (110), a rear face (115), and at least one edge (120). In some instances, the composite wood panel body (105) comprises medium density fiberboard (MDF).

Act 520 includes disposing a priming layer (210) over the front face (110) and/or the rear face (115) of the composite wood panel body (105). In some implementations, act 520 may include disposing the priming layer (210) over the rear face (115), one or more edges (120), and/or any surface of the composite wood panel body (105) that receives one or more connection components (205, see act 530). For example, in some instances, act 520 may include disposing the priming layer over the front face (110), the rear face (115), and all edges (120) of the composite wood panel body (105). In some implementations, the priming layer may comprise an oil-based priming agent, a latex-based priming agent, or a shellac-based priming agent.

In this regard, according to act 520, a user may dispose the priming layer (210) over one or more surfaces of the composite wood panel body (105) that become occluded or concealed from view when the composite wood panel body (105) becomes affixed to a prefabricated wall system (300). For example, when the composite wood panel body (105) is secured to the one or more structural members (310) of a prefabricated wall system (300), the rear face (115) or at least one edge (120) to which one or more connection components (205) are affixed may be substantially concealed from view from within an interior of a room (405) at least partially formed by the prefabricated wall system (300). For example, the composite wood panel body (105) may omit hinges such that the rear face (115) thereof remains concealed after installation.

As another example, when the composite wood panel body (105) is secured to one or more structural members (310) of a prefabricated wall system (300), the front face (110) is directed away from the one or more structural members (310) and toward an interior of a room (405) at least partially formed by the prefabricated wall system (300). Similarly, the rear face (115) may become directed toward the one or more structural members (310) and away from the interior of the room (405).

As yet another example, when the composite wood panel body (e.g., of prefabricated wall panel 100A) is secured to one or more structural members (310) of a prefabricated wall system (300), the composite wood panel body (e.g., of prefabricated wall panel 100A) may be arranged opposite to a separate composite wood panel body (e.g., of prefabricated wall panel 100B) secured to the prefabricated wall system (300). Furthermore, the rear face (115A) and a separate rear face (115B) of the separate composite wood panel body (e.g., of prefabricated wall panel 100B) are oriented toward one another.

Similarly, according to act 520, a user may dispose the priming layer (210) over one or more surfaces of the composite wood panel body (105) that omit an aesthetic layer (215, see act 540).

Act 530 includes affixing one or more connection components (205) to the rear face (115) over the priming layer (210). In some implementations, the one or more connection components (205) are configured to secure the composite wood panel body (105) to one or more structural members (310) of a prefabricated wall system (300). In some instances, a user may additionally, or alternatively, affix one or more connection components (205) to one or more edges (120) of the composite wood panel body (105).

Act 540 includes disposing an aesthetic layer (215) over the priming layer (210) on the front face (110). In some instances, the priming layer (210) comprises fabric, thermofoil, paint, veneer, and/or another aesthetic element. Furthermore, in some instances, act 540 may comprise refraining from disposing the aesthetic layer (215) over at least a portion of the priming layer 210 disposed on the rear face (115) (e.g., refraining from disposing the aesthetic layer (215) over 50%, 60%, 70%, 80%, 90%, or more of the rear face (115)).

In this regard, the rear face (115) and/or one or more edges (120) of the composite wood panel body (105) may at least partially omit the aesthetic layer (215) (e.g., 50%, 60%, 70%, 80%, 90%, or more of the rear face (115) may omit the aesthetic layer (215)).

Although, in various instances, the present disclosure states singular elements (e.g., a connection component, a horizontal structural member) and/or plural elements (e.g., edges, vertical structural members), those skilled in the art will appreciate, in view of the present disclosure, that one or more of any of the elements described herein can be used according to the present disclosure.

Those skilled in the art will recognize, in view of the present disclosure, that any denotations of first, second, front, back, top, bottom etc. (e.g., top assembly, bottom portion, first lateral side channel, second trim element, etc.) in the present disclosure can be somewhat arbitrary and are provided for illustrative purposes and/or for ease of description. Thus, any ordinal and/or other denotations included herein are in no way limiting of the present disclosure. One will appreciate that any other denotations not explicitly included herein are within the scope of this disclosure.

The foregoing description and Figures illustrate features, properties, details, implementations, methods and/or variations of components for prefabricated wall panels and systems configured for reduced moisture absorption. One will appreciate, in view of the present disclosure, that various embodiments of components for prefabricated wall panels and systems configured for reduced moisture absorption can include any combination of the various features, properties, details, etc. described hereinabove.

For example, in a first embodiment, a composite wood prefabricated wall panel (100) configured for reduced moisture absorption includes a composite wood panel body (105) comprising a front face (110), a rear face (115), and at least one edge (120). The composite wood prefabricated wall panel (100) also includes one or more connection components (205) affixed to the rear face (115) or the at least one edge (120). The one or more connection components (205) are configured to secure the composite wood prefabricated wall panel (100) to one or more structural members (305, 310, 320) of a prefabricated wall system (300).

Furthermore, the composite wood prefabricated wall panel (100) includes a priming layer (210) disposed over one or more surfaces of the composite wood panel body (e.g., in some instances, at least the front face (110) and/or the rear face (115) or the at least one edge (120) to which the one or more connection components (205) are affixed).

In a second embodiment, the composite wood prefabricated wall panel corresponds to the composite wood prefabricated wall panel of the first embodiment. Furthermore, according to the second embodiment, when the composite wood prefabricated wall panel is secured to the one or more structural members of the prefabricated wall system, the rear face or the at least one edge to which the one or more connection components are affixed is substantially concealed from view from within an interior of a room at least partially formed by the prefabricated wall system.

In a third embodiment, the composite wood prefabricated wall panel corresponds to the composite wood prefabricated wall panel of the first or the second embodiment. Furthermore, according to the third embodiment, the priming layer is disposed over the rear face.

In a fourth embodiment, the composite wood prefabricated wall panel corresponds to the composite wood prefabricated wall panel of the third embodiment. Furthermore, according to the fourth embodiment, when the composite wood prefabricated wall panel is secured to the one or more structural members of the prefabricated wall system, the front face is directed away from the one or more structural members and toward an interior of a room at least partially formed by the prefabricated wall system, and the rear face is directed toward the one or more structural members and away from the interior of the room.

In a fifth embodiment, the composite wood prefabricated wall panel corresponds to the composite wood prefabricated wall panel of the third or fourth embodiment. Furthermore, according to the fifth embodiment, when the composite wood prefabricated wall panel is secured to the one or more structural members of the prefabricated wall system, the composite wood prefabricated wall panel is arranged opposite to a separate composite wood prefabricated wall panel secured to the prefabricated wall system, and the rear face and a separate rear face of the separate composite wood prefabricated wall panel are oriented toward one another.

In a sixth embodiment, the composite wood prefabricated wall panel corresponds to the composite wood prefabricated wall panel of the first, second, third, fourth, or fifth embodiment. Furthermore, according to the sixth embodiment, the composite wood prefabricated wall panel further includes an aesthetic layer disposed over at least the priming layer disposed over the front face of the composite wood panel body.

In a seventh embodiment, the composite wood prefabricated wall panel corresponds to the composite wood prefabricated wall panel of the sixth embodiment. Furthermore, according to the seventh embodiment, the aesthetic layer comprises fabric, thermofoil, paint, or veneer.

In an eighth embodiment, the composite wood prefabricated wall panel corresponds to the composite wood prefabricated wall panel of the sixth or seventh embodiment. Furthermore, according to the eighth embodiment, the priming layer disposed over the rear face or the at least one edge to which the one or more connection components are affixed omits/omit the aesthetic layer.

In a ninth embodiment, the composite wood prefabricated wall panel corresponds to the composite wood prefabricated wall panel of the first, second, third, fourth, fifth, sixth, seventh, or eighth embodiment. Furthermore, according to the ninth embodiment, the composite wood prefabricated wall panel omits hinges.

In a tenth embodiment, the composite wood prefabricated wall panel corresponds to the composite wood prefabricated wall panel of the first, second, third, fourth, fifth, sixth, seventh, eighth, or ninth embodiment. Furthermore, according to the tenth embodiment, the priming layer is disposed over the front face, the rear face, and all edges of the composite wood panel body.

In an eleventh embodiment, the composite wood prefabricated wall panel corresponds to the composite wood prefabricated wall panel of the first, second, third, fourth, fifth, sixth, seventh, eighth, ninth, or tenth embodiment. Furthermore, according to the eleventh embodiment, the composite wood panel body comprises medium density fiberboard.

In a twelfth embodiment, the composite wood prefabricated wall panel corresponds to the composite wood prefabricated wall panel of the first, second, third, fourth, fifth, sixth, seventh, eighth, ninth, tenth, or eleventh embodiment. Furthermore, according to the eleventh embodiment, the priming layer comprises an oil-based priming agent, a latex-based priming agent, or a shellac-based priming agent.

In a thirteenth embodiment, a prefabricated wall system (300) configured for reduced moisture absorption includes a plurality of composite wood prefabricated wall panels (100), including at least a first composite wood prefabricated wall panel (100A) and a second composite wood prefabricated wall panel (100B). The first composite wood prefabricated wall panel (100A) includes a first front face (110A), a first rear face (115A), and a first priming layer (210A) disposed over at least the first front face (110A) and/or the first rear face (115A).

The second composite wood prefabricated wall panel (100B) includes a second front face (110B), a second rear face (115B), and a second priming layer (210B) disposed over at least the second front face (110B) and/or the second rear face (115B).

The prefabricated wall system (300) also includes a frame module (320), comprising at least a vertical structural member (305) and a horizontal structural member (310). The first composite wood prefabricated wall panel (100A) and the second composite wood prefabricated wall panel (100B) are selectively securable to the frame module (320). When the first composite wood prefabricated wall panel (100A) and the second composite wood prefabricated wall panel (100B) are secured to the frame module (320), the first rear face (115A) and the second rear face (115B) are oriented toward one another.

In a fourteenth embodiment, the prefabricated wall system corresponds to the prefabricated wall system of the thirteenth embodiment. Furthermore, according to the fourteenth embodiment, the first composite wood prefabricated wall panel comprises a connection component affixed over the first priming layer disposed over the first rear face.

In a fifteenth embodiment, the prefabricated wall system corresponds to the prefabricated wall system of the thirteenth or fourteenth embodiment. Furthermore, according to the fifteenth embodiment, the first front face of the first composite wood prefabricated wall panel comprises an aesthetic layer disposed over the first priming layer. The first rear face of the first composite wood prefabricated panel omits the aesthetic layer.

In a sixteenth embodiment, the prefabricated wall system corresponds to the prefabricated wall system of the thirteenth, fourteenth, or fifteenth embodiment. Furthermore, according to the sixteenth embodiment, the first priming layer is disposed over the first front face, the first rear face, and all edges of the first composite wood prefabricated wall panel.

In a seventeenth embodiment, the prefabricated wall system corresponds to the prefabricated wall system of the thirteenth, fourteenth, fifteenth, or sixteenth embodiment. Furthermore, according to the seventeenth embodiment, the first composite wood prefabricated wall panel comprises medium density fiberboard.

In an eighteenth embodiment, a method (500) for forming a composite wood prefabricated wall panel (100) with reduced moisture absorption properties includes obtaining composite wood panel body (510). The composite wood panel body includes a front face, a rear face, and at least one edge. The method (500) also includes disposing a priming layer over the front face and/or the rear face of the composite wood panel body (520). Furthermore, the method (500) includes affixing one or more connection components to the rear face over the priming layer (530).

In a nineteenth embodiment, the method corresponds to the method of the eighteenth embodiment. Furthermore, according to the nineteenth embodiment, the method further includes disposing the priming layer over all edges of the composite wood panel body.

In a twentieth embodiment, the method corresponds to the method of the eighteenth or nineteenth embodiment. Furthermore, according to the twentieth embodiment, the method further includes disposing an aesthetic layer over the priming layer on the front face and refraining from disposing the aesthetic layer over the priming layer on the rear face.

Various alterations and/or modifications of the inventive features illustrated herein, and additional applications of the principles illustrated herein, which would occur to one skilled in the relevant art and having possession of this disclosure, can be made to the illustrated embodiments without departing from the spirit and scope of the invention as defined by the claims, and are to be considered within the scope of this disclosure. Thus, while various aspects and embodiments have been disclosed herein, other aspects and embodiments are contemplated. While a number of methods and components similar or equivalent to those described herein can be used to practice embodiments of the present disclosure, only certain components and methods are described herein.

It will also be appreciated that systems, devices, products, kits, methods, and/or processes, according to certain embodiments of the present disclosure may include, incorporate, or otherwise comprise properties, features (e.g., components, members, elements, parts, and/or portions) described in other embodiments disclosed and/or described herein. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

The present disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. While certain embodiments and details have been included herein and in the attached disclosure for purposes of illustrating embodiments of the present disclosure, it will be apparent to those skilled in the art that various changes in the methods, products, devices, and apparatus disclosed herein may be made without departing from the scope of the disclosure or of the invention, which is defined in the appended claims. All changes which come within the meaning and range of equivalency of the claims are to be embraced within their scope.

I claim:

1. A composite wood prefabricated wall panel configured for reduced moisture absorption and reduced warping after installation, comprising:
    a composite wood panel body comprising a front face and a rear face;
    a first connection component affixed to the rear face at a top edge, the first connection component having an arm that extends away from the rear face and is angled downwards towards a bottom edge of the rear face, the first connection component being configured to hang the composite wood prefabricated wall panel from one or more structural members of a prefabricated wall system, wherein the first connection component hangs from the one or more structural member by angling the composite wood panel such that the first connection component engage from above then, once the first connection component is engaged with the one or more structural members, the composite wood panel pivots downwards about the first connection component;
    a second connection component affixed to the rear face at the bottom edge, the second connection component comprising opposing arms that form an engagement channel shaped to receive a corresponding engagement protrusion associated with one or more structural members of the prefabricated wall system and being configured to secure the composite wood prefabricated wall panel to the one or more structural members of the prefabricated wall system, wherein the second connection component engages with the one or more structural members after the composite wood panel pivots downwards about the first connection component, preventing the composite wood prefabricated wood panel from warping;
    a paint priming layer disposed over at least the rear face and the front face of the composite wood panel body, wherein the paint priming layer comprises a paint primer configured to prepare the composite wood panel body to receive a layer of paint or another aesthetic layer; and
    an aesthetic layer disposed over at least the paint priming layer disposed over the front face of the composite wood panel body, wherein at least 50% of the paint priming layer disposed over the rear face omits the aesthetic layer;
    wherein the paint priming layer, the first connection component, and the second connection component are positioned to retain the composite wood prefabricated wall panel so that it refrains from warping while installed on the prefabricated wall system.

2. The composite wood prefabricated wall panel of claim 1, wherein when the composite wood prefabricated wall panel is secured to the one or more structural members of the prefabricated wall system:
    the rear face, top edge, and bottom edge are substantially concealed from view from within an interior of a room at least partially formed by the prefabricated wall system.

3. The composite wood prefabricated wall panel of claim 1, wherein when the composite wood prefabricated wall panel is secured to the one or more structural members of the prefabricated wall system:
    the front face is directed away from the one or more structural members and toward an interior of a room at least partially formed by the prefabricated wall system, and
    the rear face is directed toward the one or more structural members and away from the interior of the room.

4. The composite wood prefabricated wall panel of claim 1, wherein when the composite wood prefabricated wall panel is secured to the one or more structural members of the prefabricated wall system:
    the composite wood prefabricated wall panel is arranged opposite to a separate composite wood prefabricated wall panel secured to the prefabricated wall system, and
    the rear face and a separate rear face of the separate composite wood prefabricated wall panel are oriented toward one another.

5. The composite wood prefabricated wall panel of claim 1, wherein the aesthetic layer comprises thermofoil.

6. The composite wood prefabricated wall panel of claim 1, wherein the aesthetic layer comprises paint.

7. The composite wood prefabricated wall panel of claim 1, wherein the aesthetic layer comprises fabric.

8. The composite wood prefabricated wall panel of claim 1, wherein the aesthetic layer comprises veneer.

9. The composite wood prefabricated wall panel of claim 1, wherein the composite wood prefabricated wall panel omits hinges.

10. The composite wood prefabricated wall panel of claim 1, wherein the paint priming layer is disposed over all edges of the composite wood panel body.

11. The composite wood prefabricated wall panel of claim 1, wherein the composite wood panel body comprises medium density fiberboard.

12. The composite wood prefabricated wall panel of claim 1, wherein the paint priming layer comprises an oil-based priming agent, a latex-based priming agent, or a shellac-based priming agent.

13. A prefabricated wall system configured for reduced moisture absorption and reduced warping after installation, comprising:
- a plurality of composite wood prefabricated wall panels, including at least a first composite wood prefabricated wall panel and a second composite wood prefabricated wall panel, wherein:
- the first composite wood prefabricated wall panel comprises:
- a first front face and a first rear face;
- a first paint priming layer disposed over at least the first front face and the first rear face, wherein the first paint priming layer comprises a paint primer configured to prepare the first composite wood prefabricated wall panel to receive a layer of paint or another aesthetic layer; and
- a first aesthetic layer disposed over the first paint priming layer disposed over first front face, wherein at least 50% of the paint priming layer disposed over the first rear face omits the first aesthetic layer;
- a first connection component affixed to the first rear face at a first top edge, the first connection component having an arm that extends away from the first rear face and is angled downwards towards a first bottom edge of the first rear face, the first connection component being configured to hang the composite wood prefabricated wall panel from one or more structural members of a prefabricated wall system, wherein the first connection component hangs from the one or more structural member by angling the first composite wood panel such that the first connection component engages from above then, once the first connection component is engaged with the one or more structural members, the first composite wood panel pivots downwards about the first connection component;
- a second connection component affixed to the first rear face at the first bottom edge, the second connection component comprising opposing arms that form an engagement channel shaped to receive a corresponding engagement protrusion of the one or more structural members, wherein the second connection component engages with the one or more structural members after the composite wood panel pivots downwards about the first connection component, preventing the first composite wood prefabricated wood panel from warping;
- the second composite wood prefabricated wall panel comprises:
- a second front face and a second rear face; and
- a second paint priming layer disposed over at least the second front face and the second rear face, wherein the second paint priming layer comprises a paint primer configured to prepare the second composite wood prefabricated wall panel to receive a layer of paint;
- a third connection component affixed to the second rear face at a second top edge, the third connection component having an arm that extends away from the second rear face and is angled downwards towards a second bottom edge of the second rear face, the third connection component being configured to hang the second composite wood prefabricated wall panel from one or more structural members of the prefabricated wall system, wherein the third connection component hangs from the one or more structural member by angling the second composite wood panel such that the third connection component engage from above then, once the third connection component is engaged with the one or more structural members, the second composite wood panel pivots downwards about the third connection component;
- a fourth connection component affixed to the second rear face at the second bottom edge, the fourth connection component comprising opposing arms that form an engagement channel shaped to receive a corresponding engagement protrusion of the one or more structural members, wherein the fourth connection component engages with the one or more structural members after the second composite wood panel pivots downwards about the third connection component, preventing the second composite wood prefabricated wood panel from warping;
- a frame module, comprising at least a vertical structural member and a horizontal structural member, wherein:
- the first composite wood prefabricated wall panel and the second composite wood prefabricated wall panel are selectively securable to the frame module by way of the first, second, third, and fourth connection components, and
- when the first composite wood prefabricated wall panel and the second composite wood prefabricated wall panel are secured to the frame module, the first rear face and the second rear face are oriented toward one another.

14. The prefabricated wall system of claim 13, wherein the first composite wood prefabricated wall panel comprises a connection component affixed over the first paint priming layer disposed over the first rear face.

15. The prefabricated wall system of claim 13, wherein the first paint priming layer is disposed over the first front face, the first rear face, and all edges of the first composite wood prefabricated wall panel.

16. The prefabricated wall system of claim 13, wherein the first composite wood prefabricated wall panel comprises medium density fiberboard.

17. A method for forming a composite wood prefabricated wall panel with reduced moisture absorption properties for reducing warping after installation, comprising:
- obtaining composite wood panel body, the composite wood panel body comprising a front face, a rear face, and at least one edge;
- disposing a paint priming layer over the front face and the rear face of the composite wood panel body, wherein the paint priming layer comprises a paint primer configured to prepare the composite wood panel body to receive a layer of paint or another aesthetic layer;
- affixing a first connection component to a top edge of the rear face over the paint priming layer, the first connection component having an angled extension arm that extends away from the rear face and is angled downwards towards a bottom edge of the rear face, wherein the angled extension arm is configured to hangs the composite wood prefabricated wall panel from one or more structural members of a prefabricated wall system;
- affixing a second connection component to a bottom edge of the rear face over the paint priming layer, the second connection component comprising opposing arms that form an engagement channel shaped to receive a corresponding engagement protrusion associated with the one or more structural members of the prefabricated wall system;

disposing an aesthetic layer over the paint priming layer on the front face; and refraining from disposing the aesthetic layer over at least 50% of the paint priming layer on the rear face.

18. The method of claim 17, further comprising:

disposing the paint priming layer over all edges of the composite wood panel body.

* * * * *